United States Patent
Kawai et al.

(10) Patent No.: US 7,912,112 B2
(45) Date of Patent: Mar. 22, 2011

(54) SPECTRUM SPREADING CIRCUIT

(75) Inventors: Hirotaka Kawai, Hamamatsu (JP); Nobuaki Tsuji, Hamamatsu (JP); Yasuomi Tanaka, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 799 days.

(21) Appl. No.: 11/825,433

(22) Filed: Jul. 6, 2007

(65) Prior Publication Data

US 2008/0032640 A1 Feb. 7, 2008

(30) Foreign Application Priority Data

Jul. 7, 2006 (JP) .................................. 2006-188196

(51) Int. Cl.
H04B 1/69 (2006.01)
(52) U.S. Cl. .................... 375/140; 375/214; 375/220
(58) Field of Classification Search .................. 375/140, 375/143, 148, 130
See application file for complete search history.

(56) References Cited

U.S. PATENT DOCUMENTS

| | | | | |
|---|---|---|---|---|
| 4,291,409 A | * | 9/1981 | Weinberg et al. | 375/347 |
| 4,583,231 A | * | 4/1986 | Puckette | 375/134 |
| 4,952,884 A | * | 8/1990 | Tokumo et al. | 330/10 |
| 6,567,482 B1 | * | 5/2003 | Popovic' | 375/343 |
| 6,956,431 B2 | * | 10/2005 | Maejima | 330/10 |
| 7,095,260 B2 | | 8/2006 | Miyata et al. | |
| 2004/0136440 A1 | * | 7/2004 | Miyata et al. | 375/130 |
| 2006/0076997 A1 | * | 4/2006 | Ogasawara | 327/291 |

FOREIGN PATENT DOCUMENTS

| | | |
|---|---|---|
| CN | 1510839 (A) | 7/2004 |
| JP | 7-85524 | 9/1995 |
| JP | 2004-207846 | 7/2004 |
| JP | 2004-282714 | 10/2004 |

OTHER PUBLICATIONS

Japanese Patent Office: Notification of Reason for Refusal, (No. 2006-188196; dated Jun. 11, 2008; 3 pgs.).
Extended European Search Report for Application No. 07013391.3, dated Oct. 15, 2009 (7 pgs.).
Notification of First Office Action for Application No. 200710128635.X, dated Sep. 25, 2009 (4 pgs.).

* cited by examiner

*Primary Examiner* — Chieh M Fan
*Assistant Examiner* — Qutbuddin Ghulamali
(74) *Attorney, Agent, or Firm* — Pillsbury Winthrop Shaw Pittman LLP

(57) ABSTRACT

A spectrum spreading circuit, includes a control portion that repeats a sequence in which the control portion generates a designation signal for designating all of plural frequencies in prescribed order by selecting a next frequency from the frequencies which have not been selected, and a signal generating portion that sequentially generates output signals having the designated frequencies respectively on the basis of the designation signal.

9 Claims, 12 Drawing Sheets

SPECTRUM SPREADING CIRCUIT

BACKGROUND OF THE INVENTION

The present invention relates to a technique for spreading a signal spectrum.

Techniques of varying the frequency of a signal to suppress electromagnetic interference (EMI) noise included in a signal are known. JP-B-7-85524 discloses a technique of producing an output signal by generating a triangular wave which is frequency-modulated according to a random signal and PWM-amplifying an input signal according to the generated triangular wave.

JP-A-2004-282714 discloses a technique of producing an output signal by generating, with a PLL circuit, a triangular wave which is synchronized with a frequency-modulated reference signal and PWM-amplifies an input signal according to the generated triangular wave.

Incidentally, where frequencies are selected according to a random signal, every frequency is designated as the next frequency at the same probability and some deviation may occur in designated frequencies in the short term. For example, where one of five frequencies (first to fifth frequencies) is selected randomly each time, the probability that the first frequency will be selected next is 20% even if the current frequency is also the first frequency. That is, although all frequencies occur at the same probability in the long term, a frequency deviation may occur in the short term. That is, the related techniques have a problem that EMI noise in an output signal may increase due to frequency deviation.

Furthermore, to spread the spectrum of an output signal, the related techniques require the frequency modulation circuit or the PLL circuit, which raises another problem that the circuit configurations are complex.

SUMMARY OF THE INVENTION

The present invention has been made in view of the above circumstances and an object of the invention is therefore to suppress EMI reliably with a simple configuration.

To attain the above object, a spectrum spreading circuit according to the invention comprising:

a control portion (e.g., the control section 20 of the embodiment) that repeats a sequence in which the control portion generates a designation signal for designating all of plural frequencies in prescribed order by selecting a next frequency from the frequencies which have not been selected; and a signal generating portion (e.g., the signal generating section 10 of the embodiment) that sequentially generates output signals having the designated frequencies respectively on the basis of the designation signal.

According to the invention, since the same frequency is not selected consecutively because the frequencies are selected in the prescribed order in each sequence. Therefore, even in the short term, the spectrum of EMI noise can be spread reliably and hence EMI can be suppressed. Furthermore, since the control portion can make frequency selection among the frequencies, to spread the spectrum it is not necessary to employ a circuit configuration including a frequency conversion circuit or a PLL circuit, which makes it possible to simplify the configuration greatly.

Preferably, the signal generating portion generates the output signals as clock signals having binary logical levels. The control portion switches among the plural frequencies designated by the designation signal so that the numbers of pulses of the clock signals having the frequencies respectively become identical. By the above configuration, the frequency designated by the control portion is switched every time a prescribed number of pulses of the clock signal are generated. The probability of occurrence of each of the plural frequencies depends on the period corresponding to it. Therefore, if the periods corresponding to the respective frequencies are approximately the same, the probabilities of occurrence of the respective frequencies can be made approximately identical.

Here, it is preferable that, the control portion includes a frequency dividing portion which divides a frequency of the clock signal to generate frequency-divided signals, and a designation signal generating portion which generates the designation signal on the basis of the frequency-divided signals. In this case, the clock signal is fed back to the control portion and is frequency-divided so that resulting signals correspond to the same number of pulses of the clock signal. Since the frequency switching is performed by feeding back the clock signal which is an output signal, no PLL circuit or frequency conversion circuit is necessary and hence the circuit configuration can be simplified.

Here, it is preferable that, the signal generating portion includes a triangular wave generating portion which generates a triangular wave having a constant amplitude and adjusts a slope of the triangular wave on the basis of the designation signal, a comparing portion which compares a voltage of the triangular wave with a reference voltage (e.g., the upper limit voltage ULMT and the lower limit voltage DLMT shown in FIG. 2), and a clock signal generating portion which generates the clock signal on the basis of a comparison result of the comparing portion. This configuration makes it possible to set a frequency of the clock signal by adjusting the slope of the triangular wave.

More specifically, it is preferable that the designation signal is configured by a plurality of individual designation signals. The triangular wave generating portion includes a capacitance element and a plurality of current supply units for supplying currents to the capacitance element, and outputs a voltage across the capacitance element as the triangular wave. The current supply units are correspond to the individual designation signals respectively; and wherein each of the current supply units includes a first constant current source which is on/off-controlled by the corresponding individual designation signal, allows a constant current to flow into the capacitance element when the first constant current source is in an on-state, and interrupts the constant current when the first constant current source is in an off-state, and a second constant current source which is on/off-controlled by the corresponding individual designation signal, allows a constant current to flow out of the capacitance element when the second constant current source is in an on-state, and interrupts the constant current when the second constant current source is in an off-state. According to the above configuration, the magnitude of a current for charging and discharging the capacitance element can be determined by which of the plural current supply units is enabled. The capacitance element is charged and discharged by a constant current, which makes it possible to adjust the slope of the triangular wave.

Preferably, in the frequencies, a highest frequency and a lowest frequency are set as a first frequency, a frequency adjacent to the first frequency is set as a second frequency, and a frequency which is adjacent to the second frequency and is not the first frequency is set as a third frequency. The control portion sequentially selects the frequencies in ascending or descending order every other frequency. If the third frequency is selected first among the first to third frequencies, the control portion selects the first frequency next, then selects the second frequency, and thereafter selects every other frequency sequentially. If the second frequency is selected first among the first to third frequencies, the control portion selects the first frequency next, then selects the third frequency, and thereafter selects every other frequency sequentially.

For example, assume that the plural frequencies are 480 kHz, 490 kHz, 500 kHz, 510 kHz, and 520 kHz. Since the highest frequency is 520 kHz, the first, second, and third frequencies are 520 kHz, 510 kHz, and 500 kHz, respectively. If sequential frequency selection is started in ascending order and the third frequency (500 kHz) is selected first, the first frequency (520 kHz) is selected next and then the second frequency (510 kHz) is selected. Since in this example the lowest frequency is 480 kHz, the first, second, and third frequencies are 480 kHz, 490 kHz, and 500 kHz, respectively. If sequential frequency selection is started in descending order and the second frequency (490 kHz) is selected first, the first frequency (480 kHz) is selected next and then the third frequency (500 kHz) is selected. Selecting the frequencies in this manner makes it possible to select the frequencies uniformly and hence to suppress EMI.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE PREFERRED EMBODIMENTS

1. Embodiment

Figure 1:
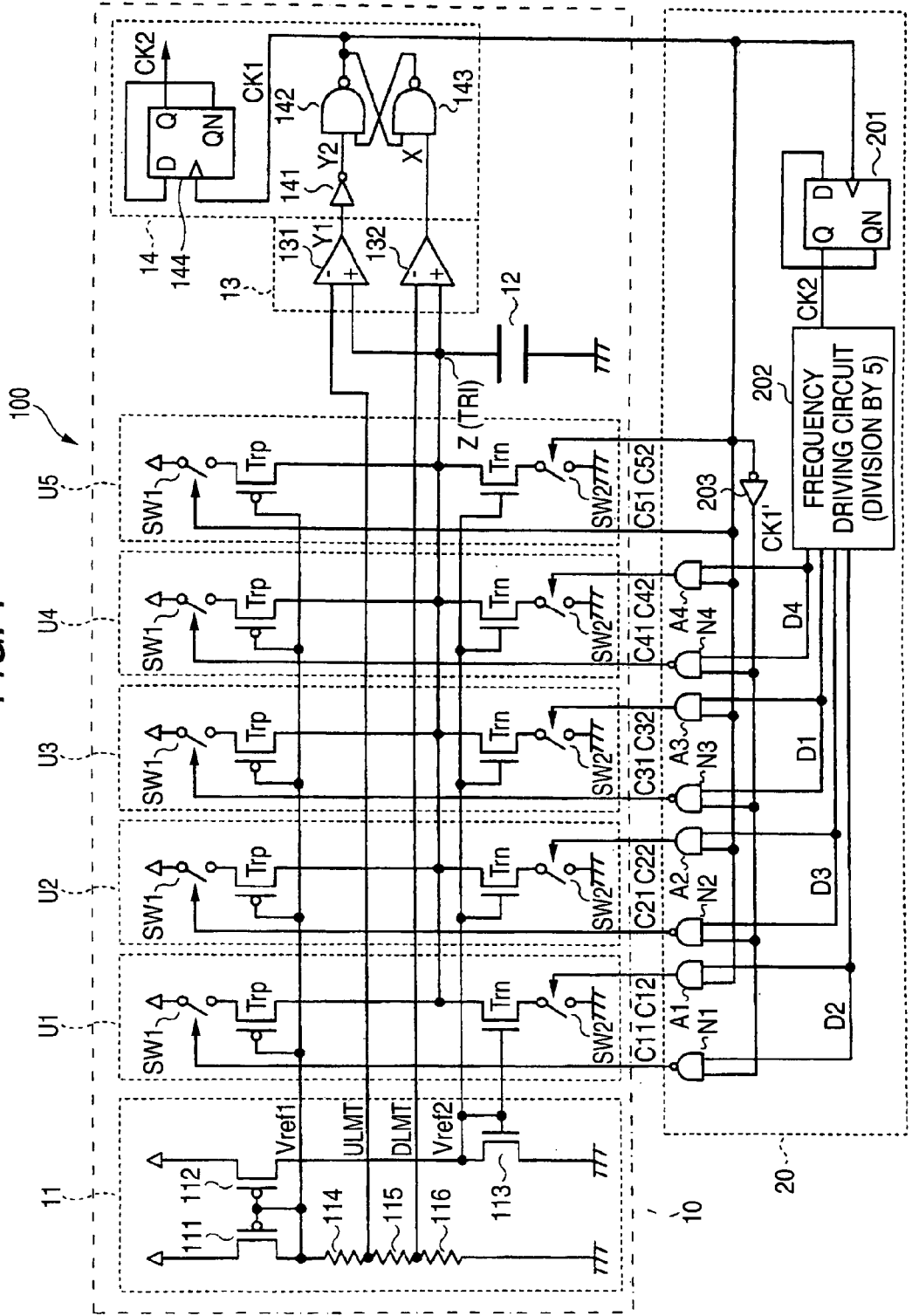
FIG. 1 is a block diagram showing the configuration of a spectrum spreading circuit.

The configuration of a spectrum spreading circuit according to an embodiment of the present invention will be described below with reference to FIG. 1. The spectrum spreading circuit 100 shown in FIG. 1 includes a signal generating section 10 which generates a first clock signal CL1 and a second clock signal CK2 and a control section 20 which controls the frequencies of the first clock signal CL1 and the second clock signal CK2 that are generated by the signal generating section 10.

The signal generating section 10 includes a voltage generating circuit 11, current supply units U1-U5, a capacitance element 12, a comparison circuit 13, and a clock signal generating circuit 14. In the voltage generating circuit 11, a p-channel transistor 111 functions as a diode because its gate and drain are connected to each other. A series connection of resistors 114, 115, and 116 is connected between the drain of the transistor 111 and a ground line (which supplies a ground voltage). The voltage at the connecting point of the resistors 114 and 115 is output as an upper limit voltage ULMT, and the voltage at the connecting point of the resistors 115 and 116 is output as a lower limit voltage DLMT. The upper limit voltage ULMT determines an upper limit voltage of a triangular wave (described later) and the lower limit voltage DLMT determines its lower limit voltage. A p-channel transistor 112 constitutes a current mirror circuit together with the transistor 111, and hence a current that is proportional to a current flowing through the transistor 111 flows through the transistor 112 and the transistor 113. The drain of the transistor 112 is connected to the drain and gate of an n-channel transistor 113. The gate voltage of the transistor 112 is output as a first reference voltage Vref1 and the gate voltage of the transistor 113 is output as a second reference voltage Vref2.

The current supply units U1-U5 charge and discharge the capacitance element 12. The current supply units U1-U5 have the same configuration except for the sizes of transistors used therein. The current supply unit U1 will be described here. The current supply unit U1 is configured in such a manner that a series connection of a switch SW1, a p-channel transistor Trp, an n-channel transistor Trn, and a switch SW2 is connected between the ground line and a power line which supplies a power supply voltage. Whereas the first reference voltage Vref1 is supplied to the gate of the transistor Trp, the second reference voltage Vref2 is supplied to the gate of the transistor Trn.

The switch SW1, which is a p-channel transistor, for example, is rendered on when a designation signal C11 is at a low level and rendered off when it is at a high level. When the switch SW1 is in an on-state, the transistor Trp allows a constant current corresponding to the first reference voltage Vref1 to flow into the capacitance element 12, whereby the capacitance element 12 is charged by the constant current and the voltage TRI at a node Z is increased. At this time, the voltage TRI has a linear waveform whose slope corresponds to the magnitude of the charging current. The switch SW1 and the transistor Trp are on/off-controlled by the designation signal (individual designation signal) C11 and function as a first constant current source which allows a constant current to flow into the capacitance element 12 in the on-state and interrupts the constant current in the off-state.

On the other hand, the switch SW2, which is an n-channel transistor, for example, is rendered on when a designation signal C12 is at a high level and rendered off when it is at a low level. When the switch SW2 is in an on-state, the transistor Trn allows a constant current corresponding to the second reference voltage Vref1 to flow out of the capacitance element 12, whereby the capacitance element 12 is discharged by the constant current and the voltage TRI at the node Z is decreased. At this time, the voltage TRI has a linear waveform whose slope corresponds to the magnitude of the discharge current. The switch SW2 and the transistor Trn are on/off-controlled by the designation signal (individual designation signal) C12 and function as a second constant current source which allows a constant current to flow out of the capacitance element 12 in the on-state and interrupts the constant current in the off-state.

In this example, the transistor sizes of the current supply unit U1 are set so that the charging current and the discharge current for the capacitance element 12 become identical. This feature also applies to the current supply units U2-U5. Charging and discharging the capacitance element 12 using a constant current in the above manner makes it possible to output the voltage at the node Z in the form of a triangular wave TRI. If the amplitude is kept constant, the frequency of the triangular wave TRI is determined by the slope of its waveform. In this embodiment, the frequency of the triangular wave TRI is adjusted by keeping the amplitude of the triangular wave TRI constant and switching the logical levels of the designation signals C11, C12, C21, C22, C31, C32, C41, C42, C51, and C52 in a prescribed sequence.

More specifically, when the capacitance of the capacitance element 12 is set at 10 pF, the current values of the current supply units U1-U5 are set at, for example, 3 μA, 2.25 μA, 1.5 μA, 0.75 μA, and 24 μA, respectively. The current supply unit U5 is enabled when the frequency of the triangular wave TRI should be set at 480 kHz. The current supply units U5 and U4 are enabled when the frequency of the triangular wave TRI should be set at 490 kHz. The current supply units U5 and U3 are enabled when the frequency of the triangular wave TRI should be set at 500 kHz. The current supply units U5 and U2 are enabled when the frequency of the triangular wave TRI should be set at 510 kHz. The current supply units U5 and U1 are enabled when the frequency of the triangular wave TRI should be set at 520 kHz. The current value of each of the current supply units U1-U5 can be set by adjusting the sizes ((gate width)/(gate length)) of the transistors Trp and Trn.

The comparison circuit 13 includes comparators 131 and 132. The triangular wave TRI is supplied to the positive input terminals of the comparators 131 and 132. Whereas the upper limit voltage ULMT is supplied to the negative input terminal of the comparator 131, the lower limit voltage DLMT is supplied to the negative input terminal of the comparator 132.

The clock signal generating circuit 14 includes an inverter 141, NAND circuits 142 and 143, and a D flip-flop 144. The inverter 141 and the NAND circuits 142 and 143 constitute an SR flip-flop. An output signal of the SR flip-flop is output from the NAND circuit 142 as a first clock signal CK1. The SR flip-flop sets the logical level of the first clock signal CK1 to a high level when the input signal of the inverter 141 makes a transition from a low level to a high level, and resets it to a low level when the input signal of the NAND circuit 143 makes a transition from a high level to a low level. In the D flip-flop 144, the data input terminal D is connected to the data output terminal QN (inverting output terminal). Therefore, the D flip-flop 144 halves the frequency of the first clock signal CK1 which is supplied to the clock input terminal and outputs a resulting signal as a second clock signal CK2. As such, the D flip-flop 144 functions as a frequency dividing (halving) circuit. Since the second clock signal CK2 is generated by frequency halving, the duty cycle of the second clock signal CK2 can be made equal to 50% even if that of the first clock signal CK1 is not equal to 50%. Therefore, a second clock signal having a duty cycle of 50% can be output even if the charging current and the discharging current of each of the current supply units U1-U5 do not coincide with each other.

Figure 2:
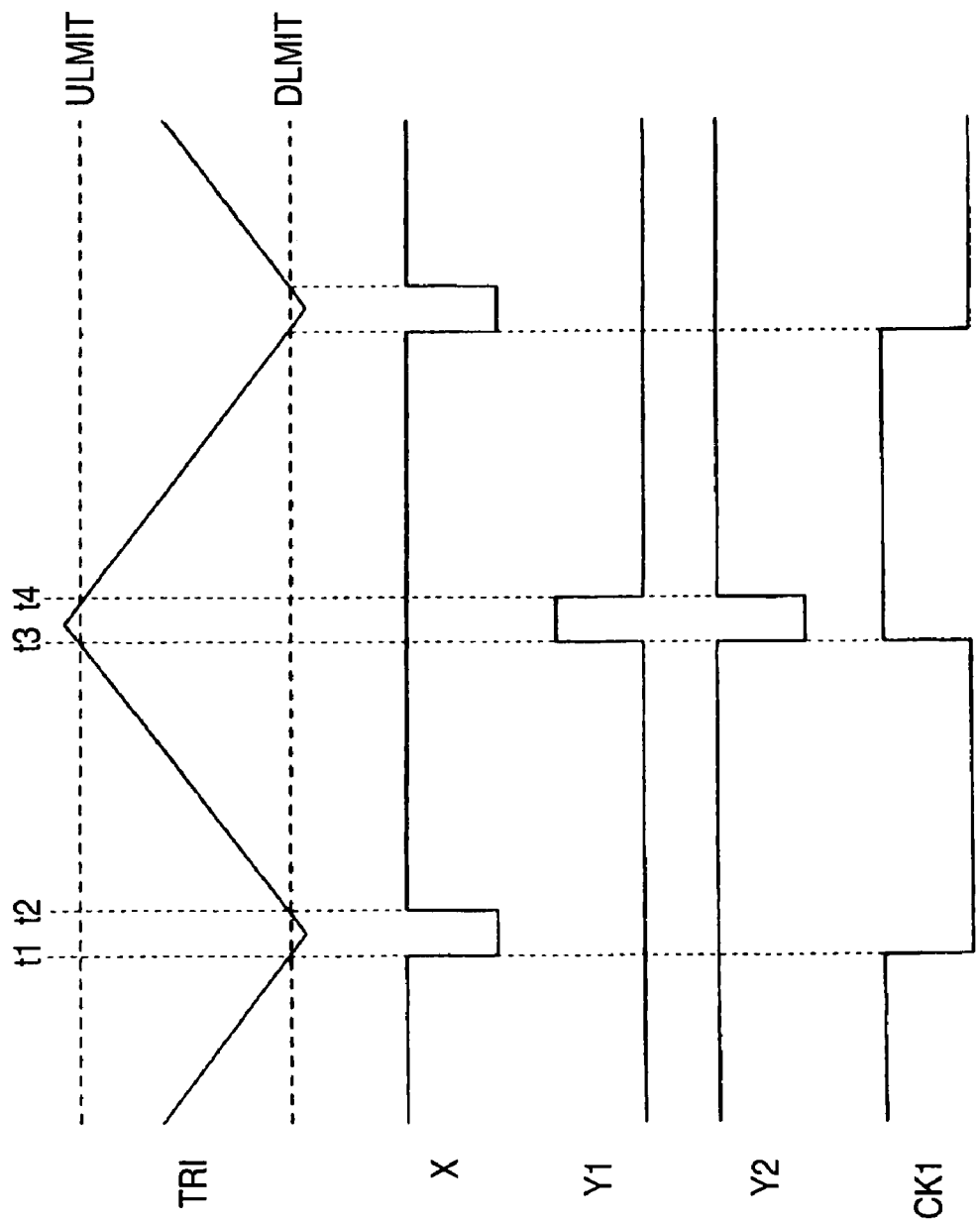
FIG. 2 is a timing chart showing the operations of a comparison circuit 13 and a clock signal generating circuit 14.

The operations of the comparison circuit 13 and the clock signal generating circuit 14 will now be described with reference to FIG. 2. When the voltage of the triangular wave TRI becomes lower than the lower limit voltage DLMT at time t1, an output signal X of the comparator 132 makes a transition from a high level to a low level. When the voltage of the triangular wave TRI then becomes higher than the lower limit voltage DLMT at time t2, the output signal X makes a transition from the low level to the high level. When the output signal X turns to the low level, the logical level of the first clock signal CK1 is reset to a low level.

When the voltage of the triangular wave TRI becomes higher than the upper limit voltage ULMT at time t3, an output signal Y1 of the comparator 131 makes a transition from a low level to a high level. When the voltage of the triangular wave TRI then becomes lower than the upper limit voltage ULMT at time t4, the output signal Y1 makes a transition from the high level to the low level. The logical level of the output signal Y1 is inverted by the inverter 141 and a resulting signal is supplied to the NAND circuit 142 as a signal Y2. When the signal Y2 turns to a low level, the logical level of the first clock signal CK1 is set to a high level. With the above operation, the logical level of the first clock signal CK1 is inverted when the voltage of the triangular wave TRI becomes lower than the lower limit voltage DLMT or higher than the upper limit voltage ULMT.

Figure 3:
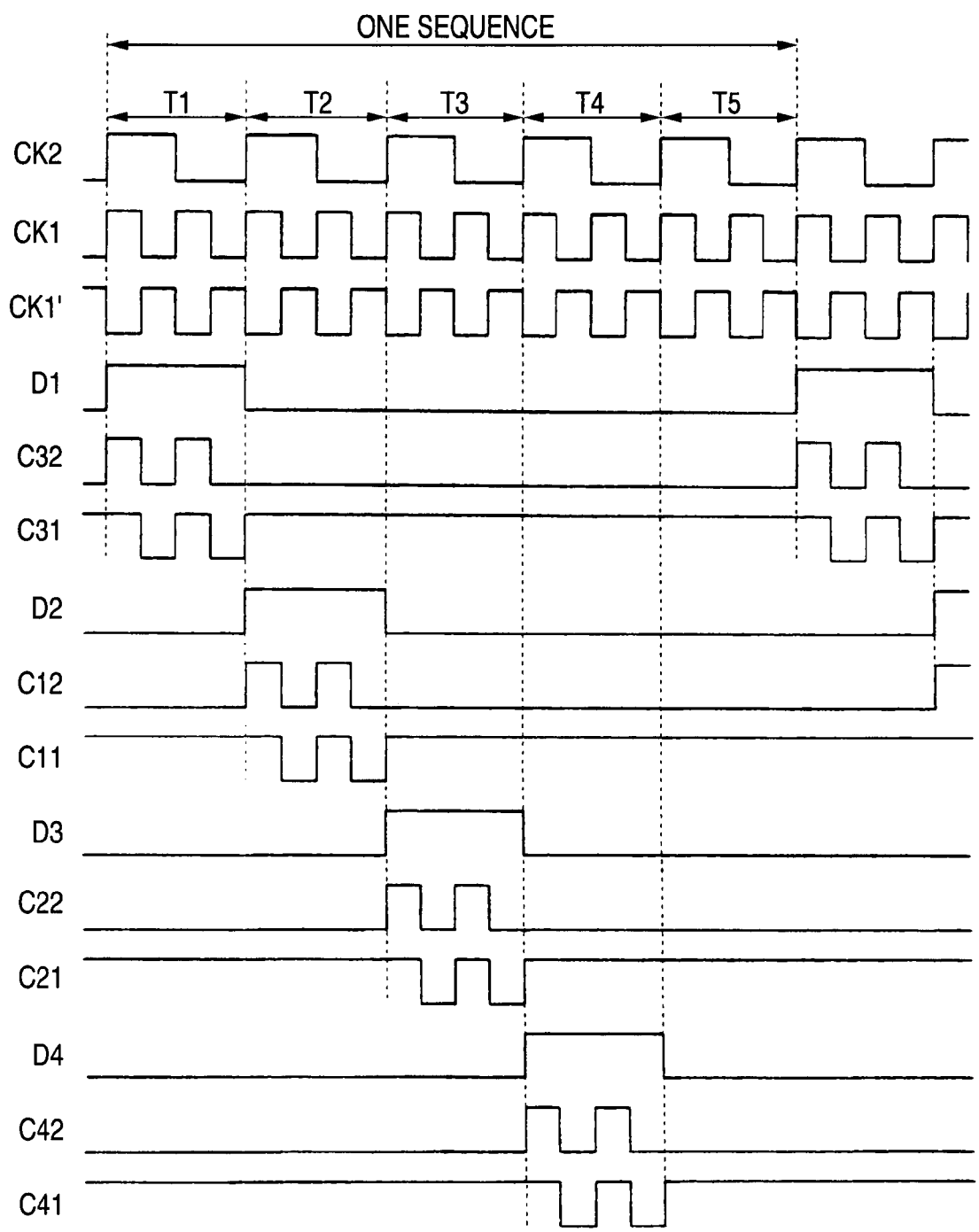
FIG. 3 is a timing chart showing the operation of a control section 20.

Next, the control section 20 shown in FIG. 1 will be described with reference to a timing chart of FIG. 3. The control section 20 includes a D flip-flop 201, a frequency dividing (division by 5) circuit 202, an inverter 203, NAND circuits N1-N4, and AND circuits A1-A4. The D flip-flop 201 generates a second clock signal CK2 by dividing the frequency of the first clock signal CK1. The frequency dividing (division by 5) circuit 202, which is a counter, counts pulses of the second clock signal CK2 and generates first to fourth frequency-divided signals D1-D4 each of which turns to a high level when the count becomes a prescribed value. In this example, the first to fourth frequency-divided signals D1-D4 turn to the high level when the count becomes "1" to "4," respectively. All of the first to fourth frequency-divided signals D1-D4 turn to a low level when the count becomes "5" (the count is thereafter reset). When the first clock signal CK1 rises from the low level to the high level next time, the count is set to "1." With this operation, as shown in FIG. 3, the logical levels of the first to fourth frequency-divided signals D1-D4 turn to the high level sequentially and exclusively.

The first clock signal CK1 is supplied to the switches SW1 and SW2 of the current supply unit U5 as the designation signals C51 and C52, respectively. Therefore, the current supply unit U5 is always enabled and the switches SW1 and SW2 are turned on alternately being synchronized with transitions of the logical level of the first clock signal CK1.

Whereas output signals of the NAND circuits N1-N4 are supplied to the switches SW1 of the current supply circuits U1-U4 as the designation signals C11, C21, C31, and C41, respectively, output signals of the AND circuits A1-A4 are supplied to the switches SW2 as the designation signals C12, C22, C32, and C42, respectively. Attention is now paid to the current supply unit U3. Whereas the first frequency-divided signal D1 is supplied to one input terminal of the AND circuit A3, the first clock signal CK1 is supplied to the other input terminal. Therefore, as shown in FIG. 3, the designation signal C32 is at a high level only while the first clock signal CK1 is at the high level in a first period T1 when the first frequency-divided signal D1 is at the high level. Furthermore, whereas the first frequency-divided signal D1 is supplied to one input terminal of the NAND circuit N3, an inverted first clock signal CK1' is supplied to the other input terminal. Therefore, as shown in FIG. 3, the designation signal C31 is at a low level only while the inverted first clock signal CK1' is at a high level in the first period T1 when the first frequency-divided signal D1 is at the high level.

As a result, the current supply unit U3 is enabled in the period T1 and disabled in the other periods T2-T5. Since as described above the current supply unit U5 is always enabled, in the period T1 the frequency of the triangular wave TRI is set by the current supply units U3 and U5. Likewise, in the period T2, the frequency of the triangular wave TRI is set by the current supply units U1 and U5. In the period T3, the frequency of the triangular wave TRI is set by the current supply units U2 and U5. In the period T4, the frequency of the triangular wave TRI is set by the current supply units U4 and U5. In the period T5, the frequency of the triangular wave TRI is set by the current supply unit U5. The first clock signal CK1 and the second clock signal CK2 are generated as one sequence consisting of the periods T1-T5 is repeated. That is, the control section 20 switches the plural frequencies that are designated by the designation signals C11-C52 so that the number of pulses of the first clock signal CK1 of each frequency becomes identical (in this example, becomes equal to "2").

Figure 4:
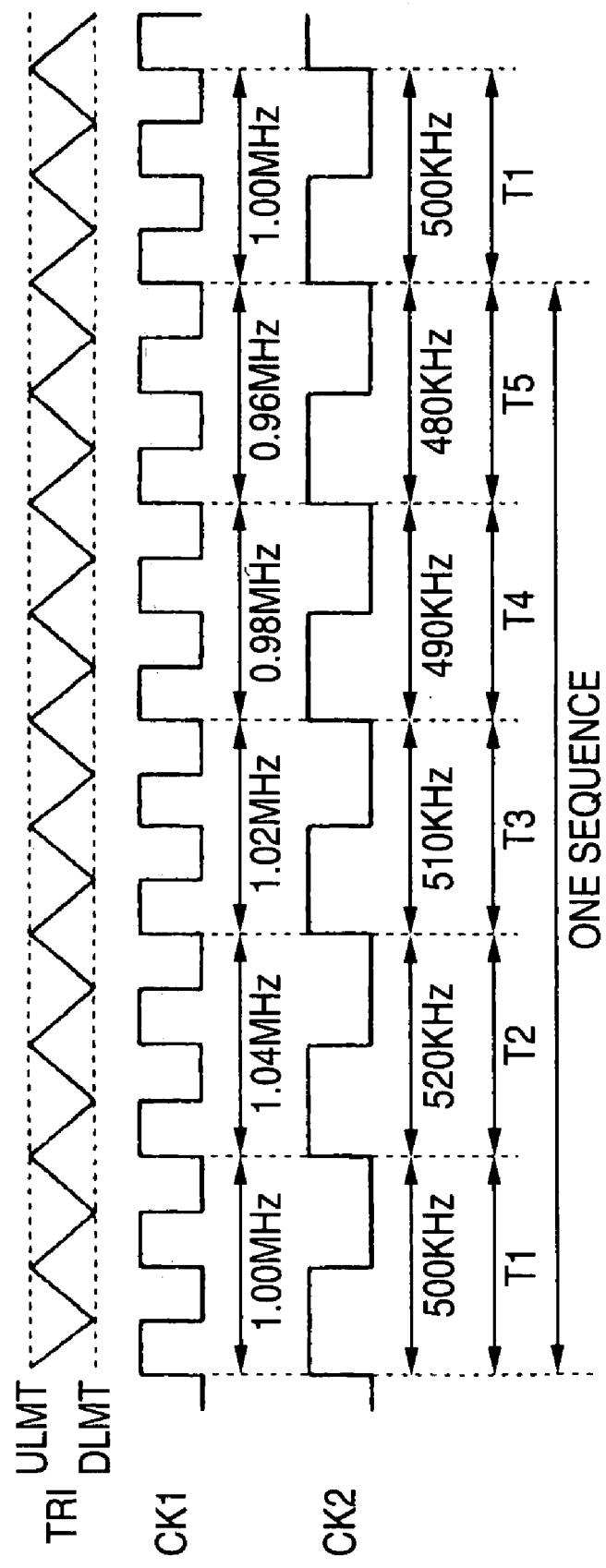
FIG. 4 is a timing chart showing a relationship between a triangular wave TRI, a first clock signal CK1, and a second clock signal CK2.

FIG. 4 is a timing chart showing a relationship between the triangular wave TRI, the first clock signal CK1, and the second clock signal CK2. When the current supply units U3 and U5 are enabled in the above-describe manner, the current to flow through the capacitance element 12 is set so that the frequency of the triangular wave TRI becomes 500 kHz. Therefore, in the period T1, the frequencies of the first clock signal CK1 and the second clock signal CK2 become 1 MHz and 500 kHz, respectively. Likewise, in the period T2 when the current supply units U1 and U5 are enabled, the frequencies of the first clock signal CK1 and the second clock signal CK2 become 1.04 MHz and 520 kHz, respectively. In the period T3 when the current supply units U2 and U5 are enabled, the frequencies of the first clock signal CK1 and the second clock signal CK2 become 1.02 MHz and 510 kHz, respectively. In the period T4 when the current supply units U4 and U5 are enabled, the frequencies of the first clock signal CK1 and the second clock signal CK2 become 0.98 MHz and 490 kHz, respectively. In the period T5 when the current supply unit U5 is enabled, the frequencies of the first clock signal CK1 and the second clock signal CK2 become 0.96 MHz and 480 kHz, respectively.

Figure 5A:
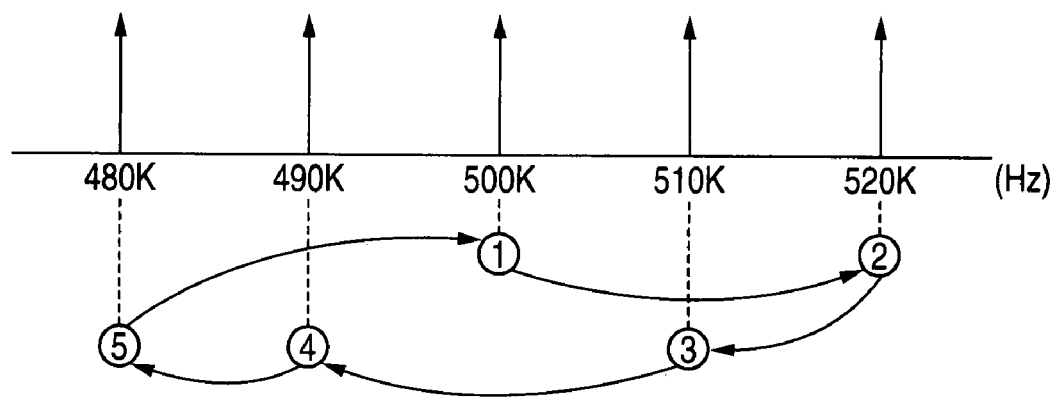
FIGS. 5A and 5B are conceptual diagrams showing frequency transitions in each sequence.
Figure 5B:
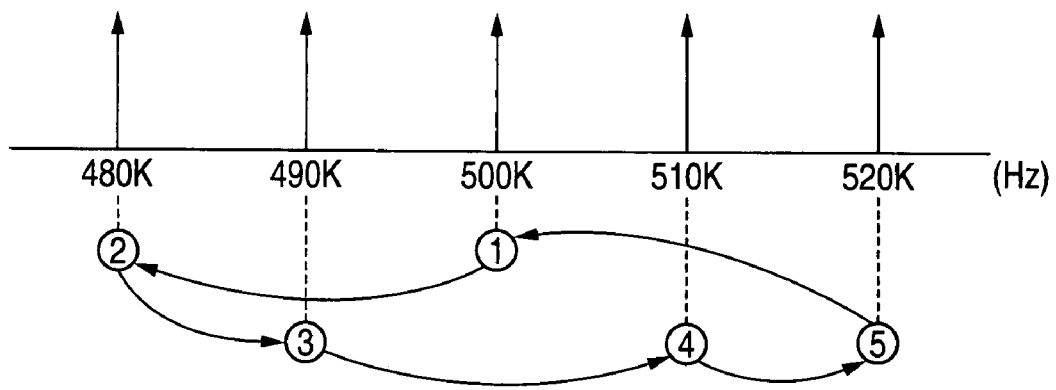

FIG. 5A is a conceptual diagram showing frequency transitions in each sequence. As shown in FIG. 5A, the frequency of the second clock signal CK2 makes transitions in order of 500 kHz→520 kHz→510 kHz→490 kHz→480 kHz. Alternatively, as shown in FIG. 5B, the frequency of the second clock signal CK2 may make transitions in order of 500 kHz→480 kHz→490 kHz→510 kHz→520 kHz. That is, in each sequence, all of the plural (in this example, five) frequencies are designated in the prescribed order in such a manner that the next frequency is selected from frequencies that have not been designated yet. In other words, the same frequency is not designated plural times in each sequence. In the case of random designation among five frequencies, a frequency to be designated next coincides with a current frequency at a probability of 20%. This may result in frequency concentration of the second clock signal CK2 in the short term. In contrast, in this embodiment, since selection is made from the plural frequencies in the predetermined order, selected frequencies of the second clock signal CK2 are dispersed reliably. No frequency is selected consecutively even in the short term, whereby EMI can be suppressed reliably.

Figure 6A:
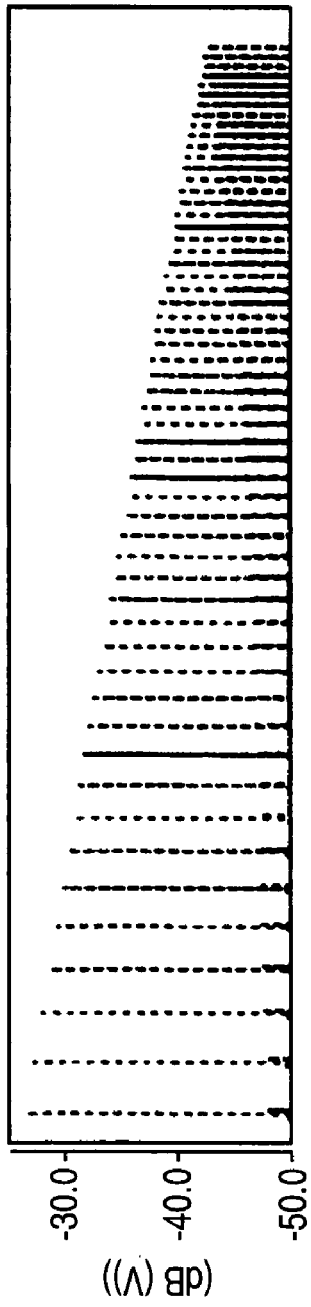
FIGS. 6A to 6C are graphs of EMI simulation examples of spectrum spreading circuits.
Figure 6B:
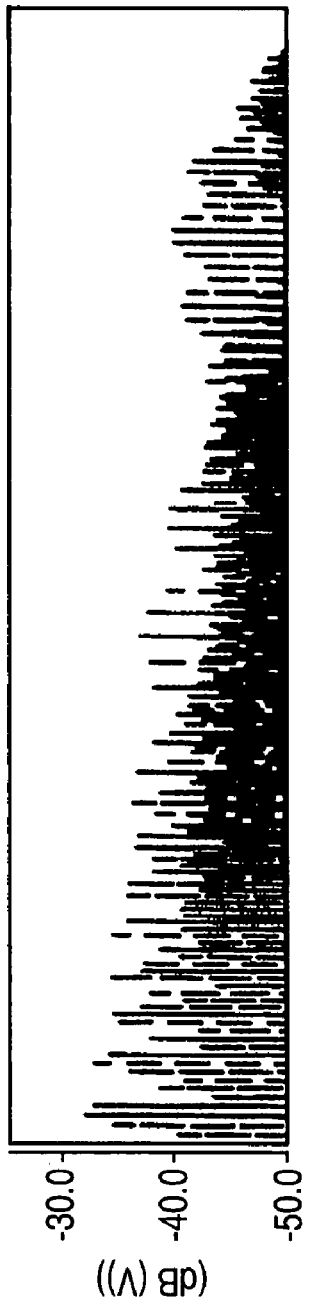
Figure 6C:
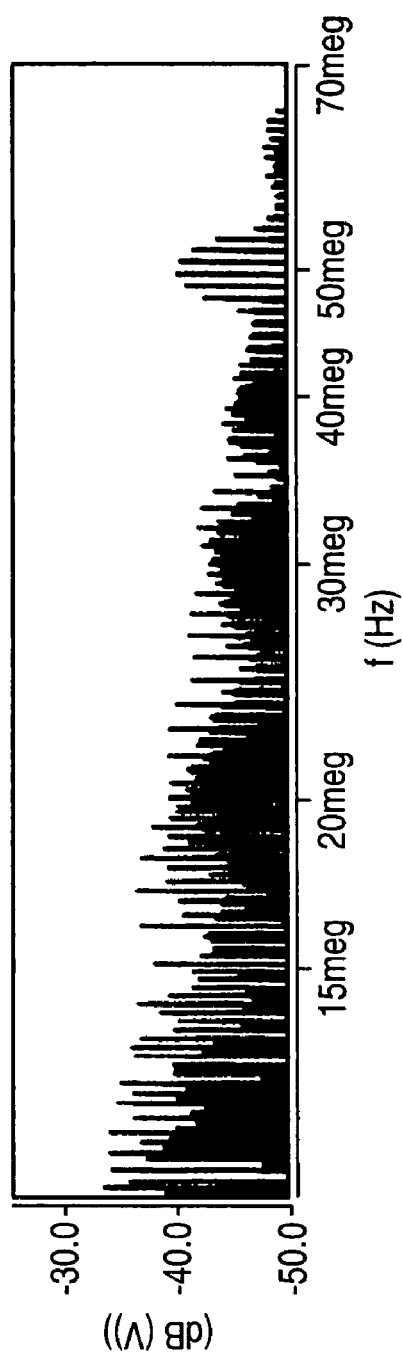
Figure 7A:
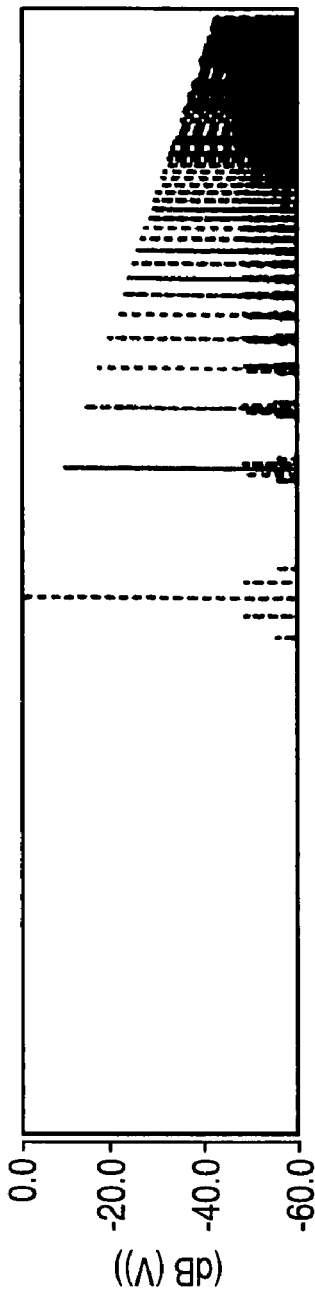
FIGS. 7A to 7C are graphs of the EMI simulation examples of the spectrum spreading circuits.
Figure 7B:
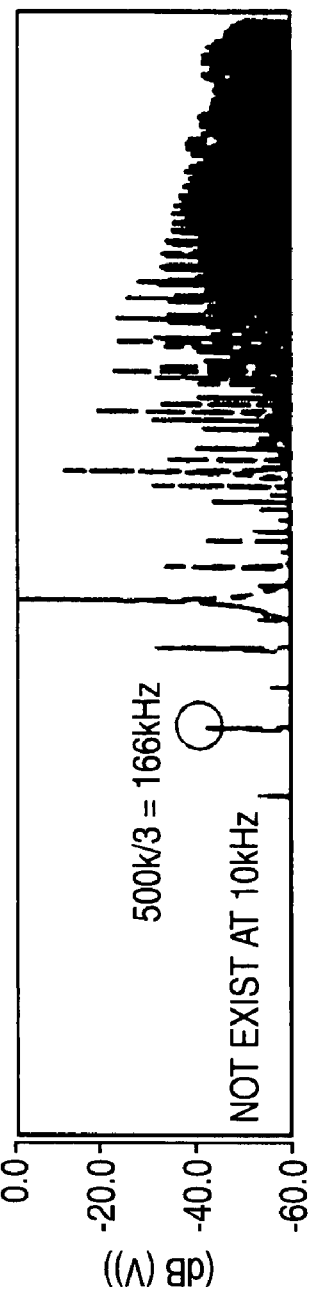
Figure 7C:
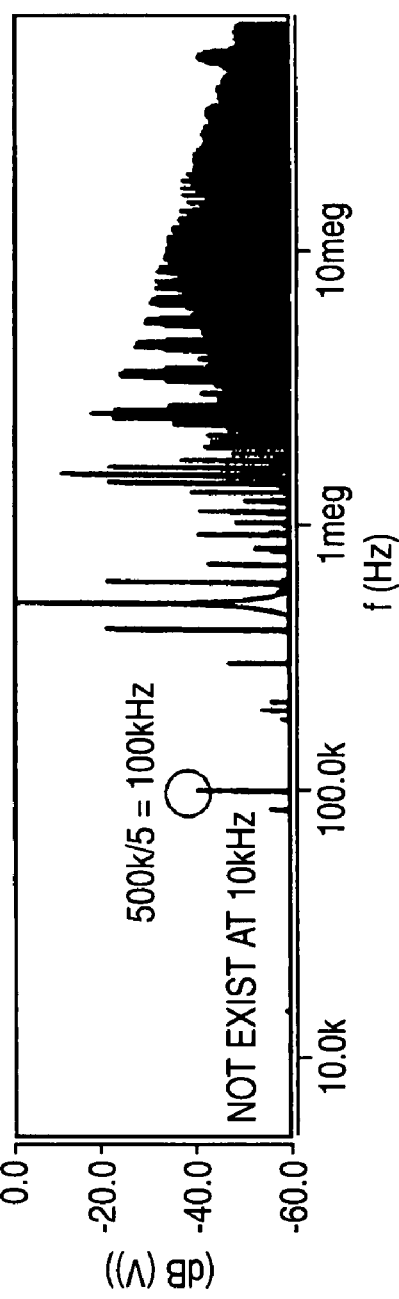

FIGS. 6A to 6C and 7A to 7C show EMI simulation examples of the spectrum spreading circuit 100. FIGS. 6A to 6C shows frequency analysis results of 10 MHz to 70 MHz. FIGS. 7A to 7C shows frequency analysis results of 1 kHz to 15 MHz. FIGS. 6A and 7A show frequency analysis results of a 500-kHz second clock signal. FIGS. 6B and 7B show frequency analysis results of a case that the frequencies of 490 kHz, 500 kHz, and 510 kHz are selected sequentially in each sequence. FIGS. 6C and 7C show frequency analysis results of a case that the frequencies of 480 kHz, 490 kHz, 500 kHz, 510 kHz, and 520 kHz are selected sequentially in each sequence.

It is seen that frequency components of 10 MHz to 70 MHz of the 3-frequency spectrum spreading (FIG. 6B) and the 5-frequency spectrum spreading (FIG. 6C) are smaller than frequency components in the same frequency range of the single frequency (FIG. 6A). This is because EMI noise spectrum is spread by the selection from the plural frequencies. It is also seen that the frequency components of the 5-frequency spectrum spreading are smaller than those of the 3-frequency spectrum spreading. This is because the spectrum is spread more widely by the 5-frequency spectrum spreading than by the 3-frequency spectrum spreading. Furthermore, in the 3-frequency spectrum spreading, a spectrum peak appears at 166 kHz (=500 kHz/3) as shown in FIG. 7B. And in the 5-frequency spectrum spreading, a spectrum peak appears at 100 kHz (500 kHz/5). These features correspond to the respective frequencies of sequences.

The above spectrum peaks are low in frequency. Where signal processing is performed by using the second clock signal CK2, mixing of low-frequency EMI noise into the frequency band of a processing subject makes it difficult to separate the noise with a filter. In this example, low-frequency EMI noise appears at 166 kHz or 100 kHz. However, where a subject of signal processing is an audio signal, its frequency band is 10 Hz to 20 kHz and hence low-frequency EMI noise can easily be removed by a filter. In contrast, where spectrum spreading is performed by using a random signal which includes low-frequency components, low-frequency EMI noise occurs in the signal band. When such EMI noise is mixed into a signal, it cannot be removed and causes reduction in SN ratio and deterioration in quality. In the embodiment, low-frequency EMI noise can be determined by the frequency of sequences and hence can be set outside a signal band.

More specifically, let fmax and fn represent the maximum frequency of a signal band of a processing subject and the frequency of sequences, respectively; then, satisfactory results can be obtained by setting the frequency fn so that a relationship fmax<fn is satisfied. Furthermore, let fc and N represent the center frequency of a clock signal to be generated and the number of frequencies to be selected, respectively; then, satisfactory results can be obtained by setting the center frequency fc and the number N so that a relationship fmax<fc/N is satisfied. For example, where the maximum frequency fmax=25 kHz and the center frequency fc=500 kHz, the number N should be set so as to satisfy a relationship N<20. In this case, setting the number N of frequencies to be selected at 19 makes it possible to suppress EMI most satisfactorily while preventing mixing of EMI noise into a signal band.

2. Modification

Figure 8A:
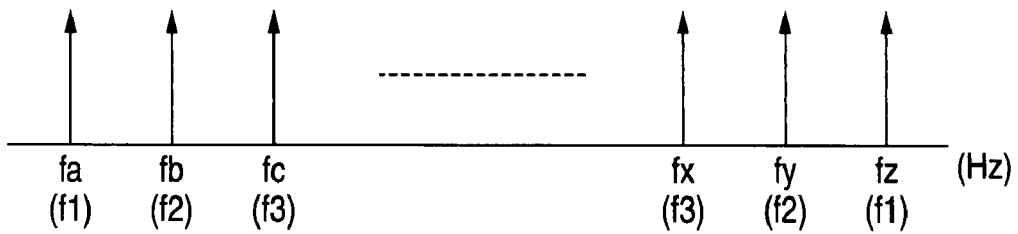
FIGS. 8A to 8C are conceptual diagrams showing how frequencies are selected according to a modification.

Although in the above-described embodiment the five frequencies are selected in each sequence, satisfactory results can be obtained as long as the number of frequencies is set at 3 or more. For example, assume a case that as shown in FIG. 8A frequencies to be selected are fa, fb, fc, . . . , fx, fy, and fz.

In this case, the highest frequency is fz and the lowest frequency is fa. Each of the highest frequency fz and the lowest frequency fa is called a first frequency f1, the frequency that is adjacent to the first frequency f1 is called a second frequency f2 (fb or fy), and the frequency that is adjacent to the second frequency f2 and is not the first frequency f1 is called a third frequency f3 (fc or fx). In this frequency arrangement, the plural frequencies are selected sequentially in ascending or descending order every other frequency. The highest frequency fz and the lowest frequency fa and frequencies close to those are selected in the following manner.

Figure 8B:
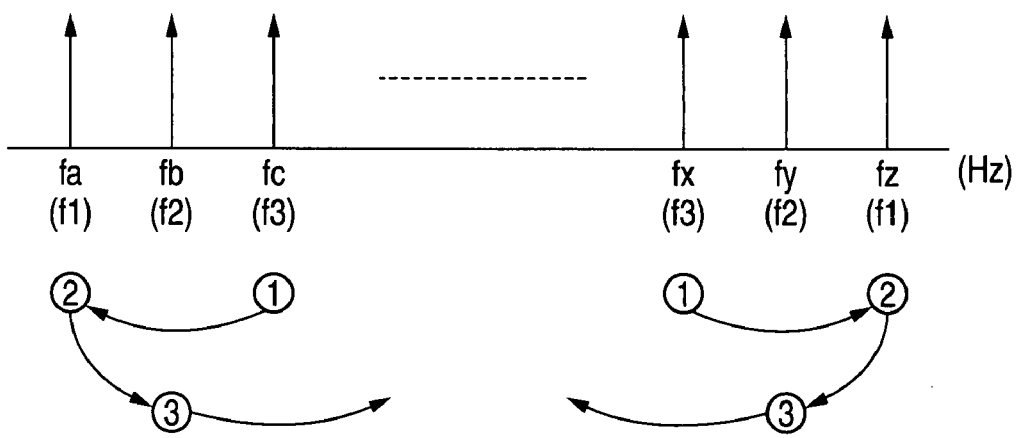
Figure 8C:
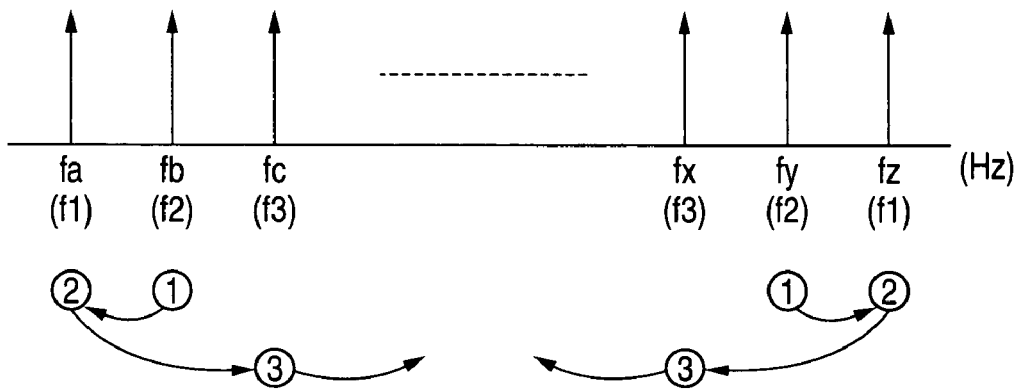

If the third frequency f3 is selected first among the first to third frequencies f1-f3, as shown in FIG. 8B the first frequency f1 is selected next and then the second frequency f2 is selected. Every other frequency is thereafter selected sequentially. On the other hand, if the second frequency f2 is selected first among the first to third frequencies f1-f3, as shown in FIG. 8C the first frequency f1 is selected next and then the third frequency f3 is selected. Every other frequency is thereafter selected sequentially. This manner of selection of the frequencies makes it possible to select the frequencies uniformly and hence to suppress EMI.

Figure 9A:
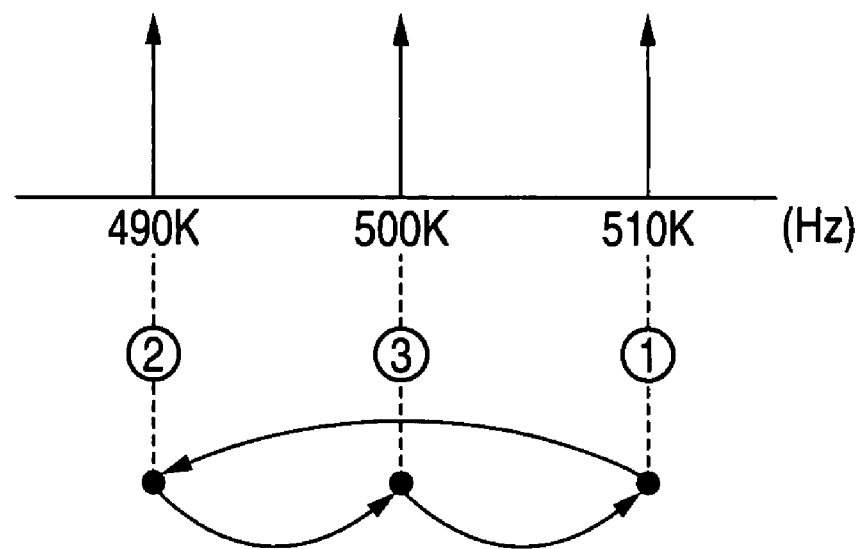
FIGS. 9A to 9B are conceptual diagrams showing frequency selection procedures in the case where the number of frequencies to be selected is 3 in the modification.
Figure 9B:
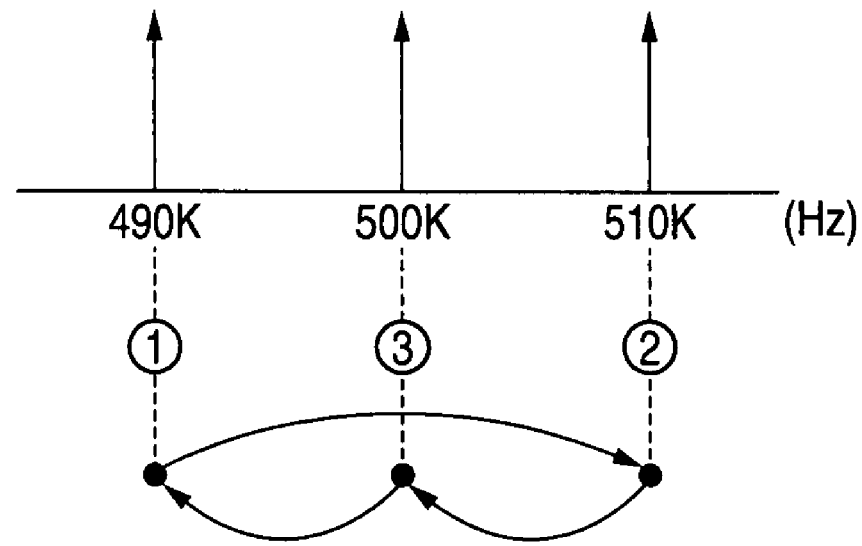

More specific selection procedures are as follows:

(1) The number of frequencies to be selected is 3:

FIGS. 9A and 9B show two kinds of selection order in the case where the number of frequencies to be selected is 3. In the example of FIG. 9A, the frequencies are selected in order of 510 kHz→490 kHz→500 kHz→510 kHz . . . . In this case, 490 kHz, 500 kHz, and 510 kHz correspond to the first frequency f1, the second frequency f2, and the third frequency f3, respectively. In this example, since the third frequency f3 (510 kHz) is selected first among the first to third frequencies f1-f3, the first frequency f1 (490 kHz) is selected next and the second frequency (500 kHz) is then selected. In the example of FIG. 9B, the frequencies are selected in order of 490 kHz→510 kHz→500 kHz→490 kHz, . . . . In this case, 510 kHz, 500 kHz, and 490 kHz correspond to the first frequency f1, the second frequency f2, and the third frequency f3, respectively.

Figure 10A:
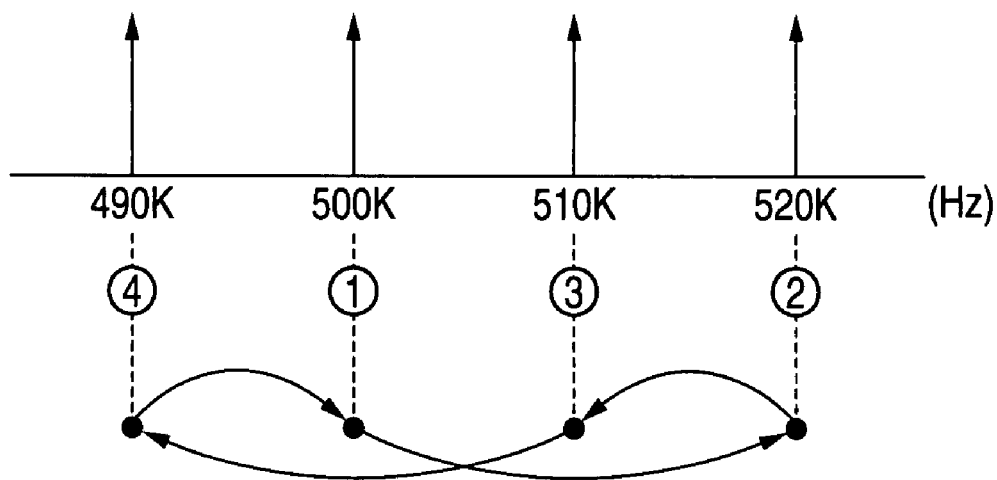
FIGS. 10A to 10B are conceptual diagrams showing frequency selection procedures in the case where the number of frequencies to be selected is 4 in the modification.
Figure 10B:
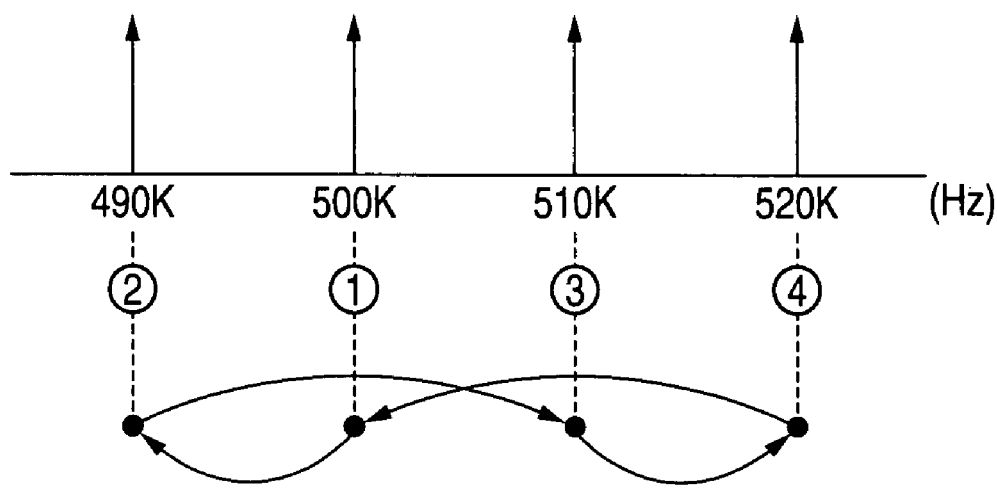

(2) The number of frequencies to be selected is 4:

FIGS. 10A and 10B show two kinds of selection order in the case where the number of frequencies to be selected is 4. In the example of FIG. 10A, the frequencies are selected in order of 500 kHz→520 kHz→510 kHz→490 kHz→500 kHz . . . . In this case, 520 kHz, 510 kHz, and 500 kHz correspond to the first frequency f1, the second frequency f2, and the third frequency f3, respectively. In this example, since the third frequency f3 (500 kHz) is selected first among the first to third frequencies f1-f3, the first frequency f1 (520 kHz) is selected next and the second frequency (510 kHz) is then selected. In the example of FIG. 10B, the frequencies are selected in order of 500 kHz→490 kHz→510 kHz→520 kHz→500 kHz . . . . In this case, 490 kHz, 500 kHz, and 510 kHz correspond to the first frequency f1, the second frequency f2, and the third frequency f3, respectively. Since the second frequency f2 (500 kHz) is selected first, the first frequency f1 (490 kHz) is selected next and the third frequency (510 kHz) is then selected.

(3) The number of frequencies to be selected is 5:

This case has already been described in the above embodiment with reference to FIGS. 5A and 5B.

Figure 11A:
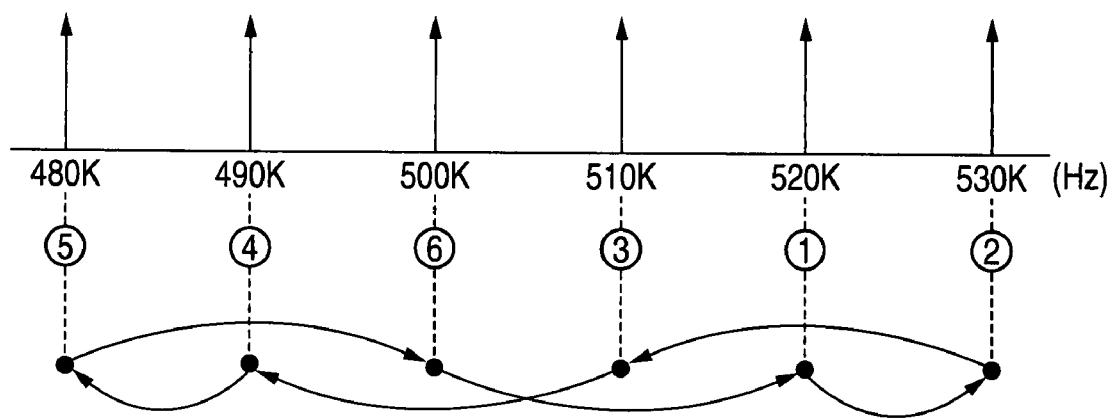
FIGS. 11A to 11B are conceptual diagrams showing frequency selection procedures in the case where the number of frequencies to be selected is 6 in the modification.
Figure 11B:
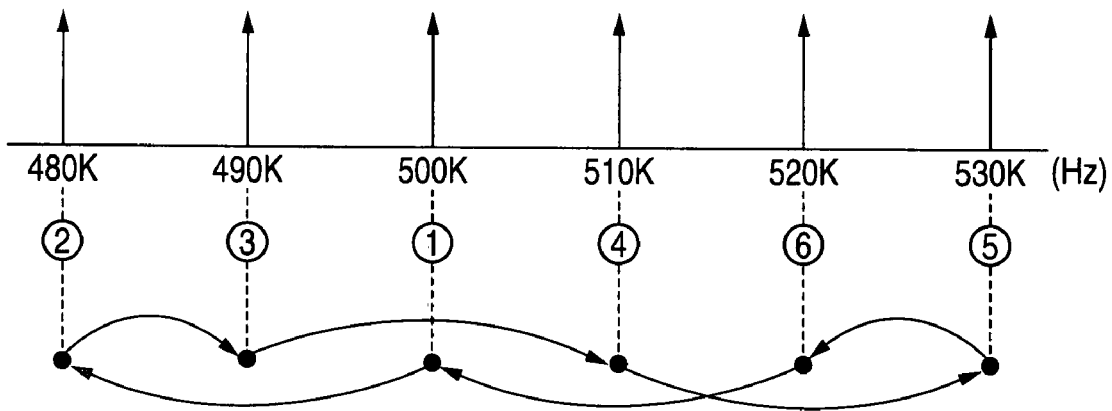

(4) The number of frequencies to be selected is 6:

FIGS. 11A and 11B show two kinds of selection order in the case where the number of frequencies to be selected is 6. In the example of FIG. 11A, the frequencies are selected in order of 520 kHz→530 kHz→510 kHz→490 kHz→480 kHz→500 kHz→520 kHz . . . . In this case, 530 kHz, 520 kHz, and 510 kHz correspond to the first frequency f1, the second frequency f2, and the third frequency f3, respectively. In this example, since the second frequency f2 (520 kHz) is selected first among the first to third frequencies f1-f3, the first frequency f1 (530 kHz) is selected next and the third frequency (510 kHz) is then selected. In the example of FIG. 11B, the frequencies are selected in order of 500 kHz→480 kHz→490 kHz→510 kHz→530 kHz→520 kHz→500 kHz . . . . In this case, 480 kHz, 490 kHz, and 500 kHz correspond to the first frequency f1, the second frequency f2, and the third frequency f3, respectively. Since the third frequency f3 (500 kHz) is selected first, the first frequency f1 (480 kHz) is selected next and the second frequency (490 kHz) is then selected.

Figure 12A:
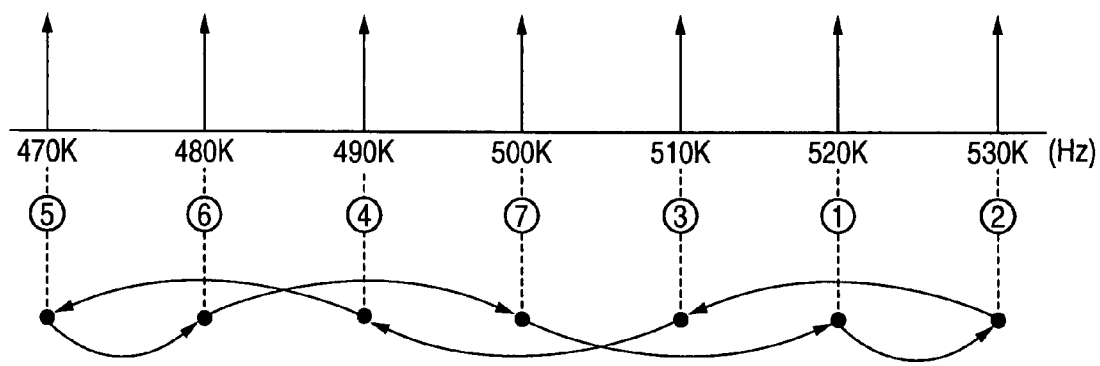
FIGS. 12A to 12B are conceptual diagrams showing frequency selection procedures in the case where the number of frequencies to be selected is 7 in the modification.
Figure 12B:
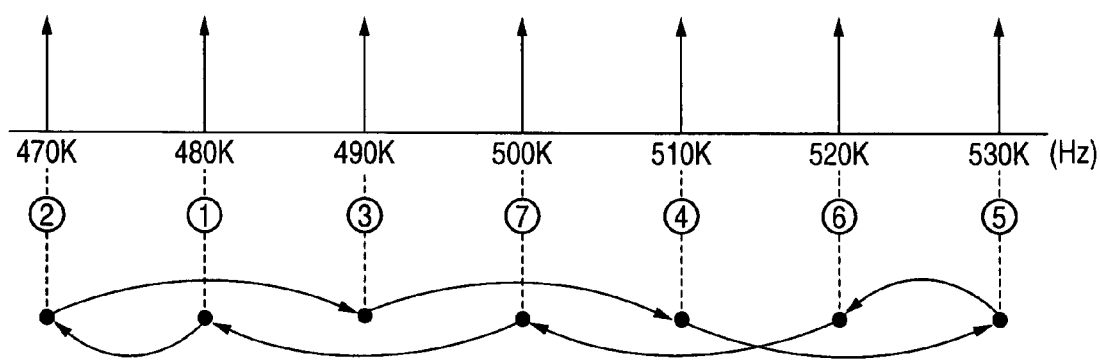

(5) The number of frequencies to be selected is 7:

FIGS. 12A and 12B show two kinds of selection order in the case where the number of frequencies to be selected is 7. In the example of FIG. 12A, the frequencies are selected in order of 520 kHz→530 kHz→510 kHz→490 kHz→470 kHz→480 kHz→500 kHz→520 kHz . . . . In this case, 530 kHz, 520 kHz, and 510 kHz correspond to the first frequency f1, the second frequency f2, and the third frequency f3, respectively. In this example, since the second frequency f2 (520 kHz) is selected first among the first to third frequencies f1-f3, the first frequency f1 (530 kHz) is selected next and the third frequency (510 kHz) is then selected. In the example of FIG. 12B, the frequencies are selected in order of 480 kHz→470 kHz→490 kHz→510 kHz→530 kHz→520 kHz→500 kHz→480 kHz . . . . In this case, 470 kHz, 480 kHz, and 490 kHz correspond to the first frequency f1, the second frequency f2, and the third frequency f3, respectively. Since the second frequency f2 (480 kHz) is selected first, the first frequency f1 (470 kHz) is selected next and the third frequency (490 kHz) is then selected.

The number of frequencies to be selected can be increased in similar manners.

[New]

Although the invention has been illustrated and described for the particular preferred embodiments, it is apparent to a person skilled in the art that various changes and modifications can be made on the basis of the teachings of the invention. It is apparent that such changes and modifications are within the spirit, scope, and intention of the invention as defined by the appended claims.

The present application is based on Japan Patent Application No. 2006-188196 filed on Jul. 7, 2006, the contents of which are incorporated herein for reference.

What is claimed is:

1. A spectrum spreading circuit, comprising:
a control portion that repeats a sequence in which the control portion generates a designation signal for designating all of four or more frequencies by selecting, from the frequencies, a next frequency which has not yet been selected during the sequence; and
a signal generating portion that sequentially generates output signals having the designated frequencies respectively on the basis of the designation signal,
wherein a highest frequency or a lowest frequency in the four or more frequencies is defined as a first frequency, a frequency adjacent to the first frequency is defined as a second frequency, and a frequency, which is adjacent to the second frequency and is other than the first frequency, is defined as a third frequency, and
wherein the control portion is configured such that:
if the third frequency is first selected among the first to third frequencies, the control portion selects the first frequency next, then selects the second frequency, and thereafter selects every other frequency sequentially in ascending or descending order of the frequencies, and if the second frequency is first selected among the first to third frequencies, the control portion selects the first frequency next, then selects the third frequency, and thereafter selects every other frequency sequentially in ascending or descending order of the frequencies.

2. The spectrum spreading circuit according to claim 1, wherein the signal generating portion generates the output signals as clock signals having binary logical levels; and wherein the control portion switches among the plural frequencies designated by the designation signal so that the numbers of pulses of the clock signals having the frequencies respectively become identical.

3. The spectrum spreading circuit according to claim 2, wherein the control portion includes:

a frequency dividing portion which divides a frequency of the clock signal to generate frequency-divided signals; and a designation signal generating portion which generates the designation signal on the basis of the frequency-divided signals.

4. The spectrum spreading circuit according to claim 2, wherein the signal generating portion includes:

a triangular wave generating portion which generates a triangular wave having a constant amplitude range and adjusts a slope of the triangular wave on the basis of the designation signal;

a comparing portion which compares a voltage of the triangular wave with a reference voltage; and a clock signal generating portion which generates the clock signal on the basis of a comparison result of the comparing portion.

5. The spectrum spreading circuit according to claim 4, wherein the designation signal is configured by a plurality of individual designation signals;

wherein the triangular wave generating portion includes a capacitance element and a plurality of current supply units for supplying currents to the capacitance element, and outputs a voltage across the capacitance element as the triangular wave;

wherein the current supply units correspond to the individual designation signals respectively; and wherein each of the current supply units includes:

a first constant current source which is on/off-controlled by the corresponding individual designation signal, allows a constant current to flow into the capacitance element when the first constant current source is in an on-state, and interrupts the constant current when the first constant current source is in an off-state; and a second constant current source which is on/off-controlled by the corresponding individual designation signal, allows a constant current to flow out of the capacitance element when the second constant current source is in an on-state, and interrupts the constant current when the second constant current source is in an off-state.

6. The spectrum spreading circuit according to claim 1, wherein the four or more frequencies have four frequencies f1 to f4 which are arranged in ascending order of the frequencies; and wherein the control portion is configured to select any one of the frequencies f1 to f4 as a starting point in a first cycle in which the frequency f2, the frequency f4, the frequency f3, the frequency f1 and the frequency f2 are selected in this order or in a second cycle in which the frequency f2, the frequency f1, the frequency f3, the frequency f4 and the frequency f2 are selected in this order.

7. The spectrum spreading circuit according to claim 1, wherein the four or more frequencies have five frequencies f1 to f5 which are arranged in ascending order of the frequencies; and wherein the control portion is configured to select any one of the frequencies f1 to f5 as a starting point in a first cycle in which the frequency f3, the frequency f5, the frequency f4, the frequency f2, the frequency f1 and the frequency f3 are selected in this order or in a second cycle in which the frequency f3, the frequency f1, the frequency f2, the frequency f4, the frequency f5 and the frequency f3 are selected in this order.

8. The spectrum spreading circuit according to claim 1, wherein the four or more frequencies have six frequencies f1 to f6 which are arranged in ascending order of the frequencies; and wherein the control portion is configured to select any one of the frequencies f1 to f6 as a starting point in a first cycle in which the frequency f3, the frequency f5, the frequency f6, the frequency f4, the frequency f2, the frequency f1 and the frequency f3 are selected in this order or in a second cycle in which the frequency f3, the frequency f1, the frequency f2, the frequency f4, the frequency f6. the frequency f5 and the frequency f3 are selected in this order.

9. The spectrum spreading circuit according to claim 1, wherein the four or more frequencies have seven frequencies f1 to f7 which are arranged in ascending order of the frequencies; and wherein the control portion selects any one of the frequencies f1 to f7 as a starting point in a first cycle in which the frequency f4, the frequency f6, the frequency f7, the frequency f5, the frequency f3, the frequency f1, the frequency f2 and the frequency f4 are selected in this order or in a second cycle in which the frequency f4, the frequency f2, the frequency f1, the frequency f3, the frequency f5, the frequency f7, the frequency f6 and the frequency f4 are selected in this order.

* * * * *